(12) United States Patent
Darrieux et al.

(10) Patent No.: US 6,751,025 B2
(45) Date of Patent: Jun. 15, 2004

(54) DOUBLE-MIRROR COMBINING GLASS FOR HEAD-UP DISPLAY

(75) Inventors: Jean-Marc Darrieux, Bordeaux (FR); Yannick Chevreau, Merignac (FR); Jean-François Gomme, Saint Martin de Laye (FR)

(73) Assignee: Thales, Paris (FR)

( * ) Notice: Subject to any disclaimer, the term of this patent is extended or adjusted under 35 U.S.C. 154(b) by 17 days.

(21) Appl. No.: 10/168,386

(22) PCT Filed: Oct. 26, 2001

(86) PCT No.: PCT/FR01/03342
§ 371 (c)(1),
(2), (4) Date: Jun. 21, 2002

(87) PCT Pub. No.: WO02/37167
PCT Pub. Date: May 10, 2002

(65) Prior Publication Data
US 2002/0190184 A1 Dec. 19, 2002

(30) Foreign Application Priority Data
Nov. 3, 2000 (FR) .............................. 00 14127

(51) Int. Cl.⁷ .................. G02B 27/14; G09G 5/00
(52) U.S. Cl. ..................... 359/630; 359/632; 345/7
(58) Field of Search .................. 359/13, 630, 632; 353/29, 119; 348/115; 345/7–9

(56) References Cited

U.S. PATENT DOCUMENTS

| 4,099,841 | A | | 7/1978 | Ellis | |
|---|---|---|---|---|---|
| 4,655,540 | A | * | 4/1987 | Wood et al. | 359/13 |
| 4,725,125 | A | * | 2/1988 | Ellis et al. | 359/632 |
| 5,479,294 | A | | 12/1995 | Darrieux et al. | |
| 5,517,337 | A | | 5/1996 | Dupin et al. | |
| 5,581,806 | A | | 12/1996 | Capdepuy et al. | |
| 6,078,428 | A | | 6/2000 | Rambert et al. | |
| 6,157,471 | A | | 12/2000 | Bignolles et al. | |
| 6,158,866 | A | | 12/2000 | Gulli et al. | |
| 6,262,849 | B1 | | 7/2001 | Potin et al. | |
| 6,356,393 | B1 | | 3/2002 | Potin et al. | |

FOREIGN PATENT DOCUMENTS

| EP | 0 459 850 | 12/1991 |
|---|---|---|
| WO | 87 01211 | 2/1987 |

OTHER PUBLICATIONS

D. Plantier et al.: "An avionic full–color collimated head laval display" SID International Symposium Digest of Technical Papers, vol. 22, pp. 123–126, May 6, 1991.

* cited by examiner

Primary Examiner—Georgia Epps
Assistant Examiner—Alicia M. Harrington
(74) Attorney, Agent, or Firm—Oblon, Spivak, McClelland, Maier & Neustadt, P.C.

(57) ABSTRACT

A double-plate combiner for a head-up visor, including two substantially flat plates substantially parallel to each other, and held fixedly together by a holding structure that includes a central baseplate, two side flanks connected to the central baseplate, and two spacers respectively connected to the side flanks and tightly holding the two plates between them. An outer plate is tightly held between free ends of the spacers and an inner plate is tightly held between the free ends, connected to the side flanks, of the spacers. An assembly of the plates, the side flanks, and the spacers has a plane of symmetry substantially orthogonal to the mid-plane of the plates. A first dimension from one spacer to the other of the outer plate is greater than a second dimension from one spacer to the other of the inner plate. The mid-plane of each spacer is not orthogonal to the mid-plane of the plates. Such a double-plate combiner can especially be applied to a head-up visor mounted in the cockpit of an aircraft, preferably of the airplane type.

9 Claims, 5 Drawing Sheets

DOUBLE-MIRROR COMBINING GLASS FOR HEAD-UP DISPLAY

BACKGROUND OF INVENTION

The invention relates to the field of double-plate combiners for a head-up visor, and especially for a head-up visor mounted in the cockpit of an aircraft, preferably of the airplane type. The function of the combiner for a head-up visor is generally to superimpose on the external scene viewed by the pilot the simultaneous display of synthetic images preferably collimated at infinity. The synthetic images intended to be superimposed on the external scene via the combiner are generated by the head-up visor. A double-plate combiner is a type of combiner comprising two plates and having the advantage, with respect to a combiner with a single plate, of increasing the on-site size of the instantaneous field in which the synthetic images intended to be viewed by the pilot can be displayed.

According to a prior art, a double-plate combiner exists, on the one hand, whose two substantially parallel plates are held by a pair of spacers, the mid-plane of which is orthogonal to the mid-plane of the plates, and, on the other hand, of which the dimension, from one spacer to the other, is the same for both plates. A drawback of this prior art is the fact of presenting a visual mask which is annoying for the pilot.

SUMMARY OF INVENTION

A first solution (not claimed) would consist in replacing the opaque material forming the plate holding structure with a material which is transparent in the visible region.

A second solution (not claimed) would consist in using spacers which are not very bulky, for example thin and with holes, and whose actual structure would present a visual mask which is small enough.

A third solution (claimed) consists of a novel structure for the combiner, in which the relative size of the plates and the inclination of the spacers of the plate holding structure are especially modified, so as to be able both, on the one hand, to provide a stable and rigid hold for the two plates in a vibrating environment which could be severe and, on the other hand, to substantially decrease the size of the visual mask connected to the plate holding structure, which visual mask is annoying for the pilot. The novel structure for the combiner according to the invention also makes it possible to attenuate or even to remove the unwanted reflections taking place on some surfaces of the spacers in the combiners of the prior art, by virtue of the novel inclination of the spacers of the holding structure. These unwanted reflections on the spacers may also be problematic for the pilot.

According to the invention, provision is made for a double-plate combiner for a head-up visor, comprising two substantially flat plates, substantially parallel to each other and held fixedly together by a holding structure which comprises a central baseplate, two side flanks connected to the central baseplate, two spacers respectively connected to the side flanks and tightly holding the two plates between them, an outer plate being tightly held between the free ends of the spacers, an inner plate being tightly held between the ends, connected to the side flanks, of the spacers, the assembly consisting of the plates, the side flanks and the spacers having a plane of symmetry substantially orthogonal to the mid-plane of the plates, characterized in that the dimension, from one spacer to the other, of the outer plate is greater than the dimension, from one spacer to the other, of the inner plate, and in that the mid-plane of each spacer is not orthogonal to the mid-plane of the plates.

BRIEF DESCRIPTION OF DRAWINGS

The invention will be better understood and other particular features and advantages will become apparent by means of the description below and the appended drawings, given by way of example, where.

DETAILED DESCRIPTION OF DRAWINGS

Figure 1:
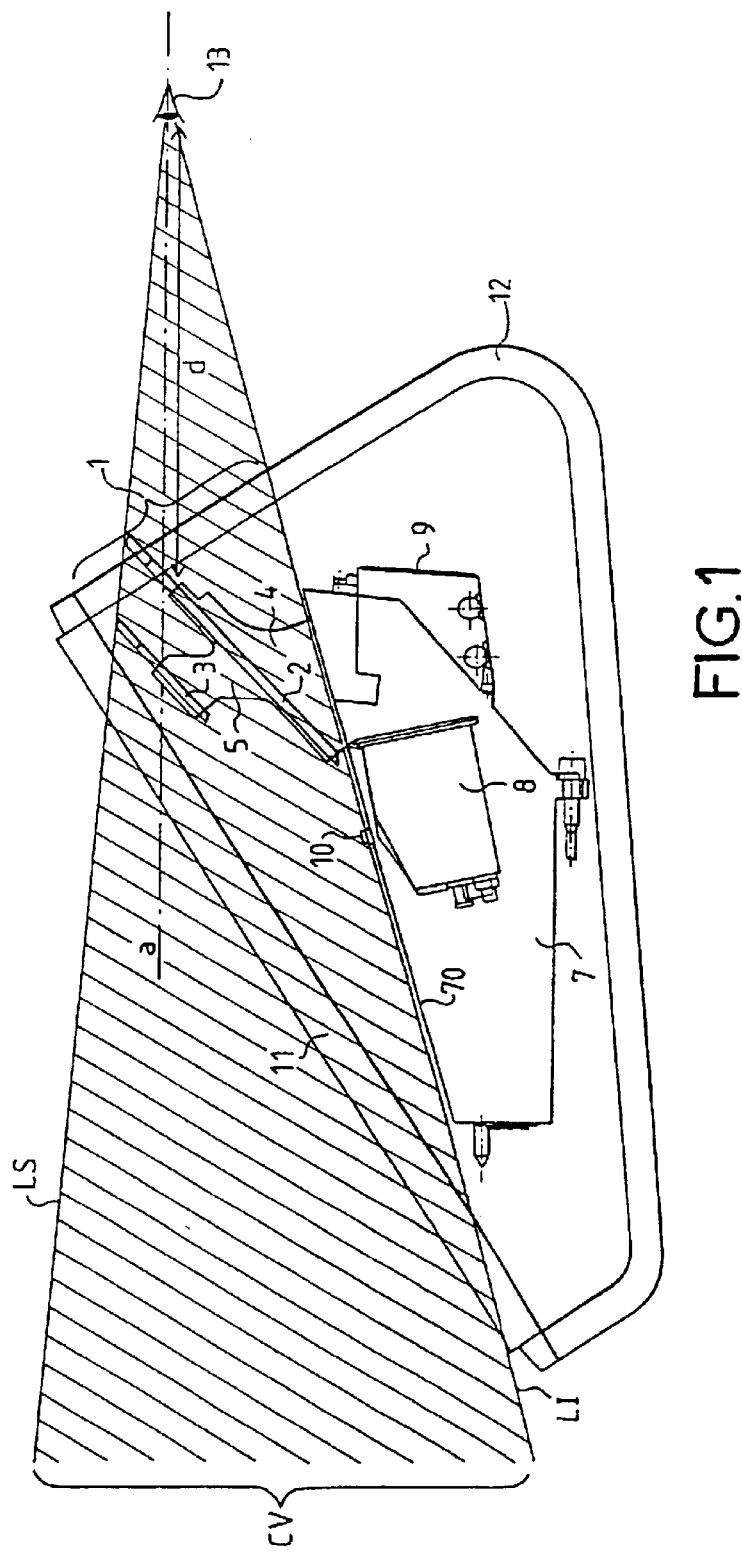
FIG. 1 schematically shows a profile view of part of an aircraft, the cockpit of which comprises a head-up visor and a double-plate combiner according to the invention.

FIG. 1 schematically shows a profile view of part of an aircraft, the cockpit of which comprises a head-up visor and a double-plate combiner according to the invention. The cockpit of the aircraft comprises a framework 12 and a windshield 11, through which windshield 11 the pilot's eyes 13 can observe a portion of the external scene corresponding to the external field of vision CV. The axis a shows the "horizontal" axis of vision of the pilot. The external field of vision CV of the pilot, shown by hatching, comprises, in elevation, an upper limit LS and a lower limit LI. A head-up visor 7 is mounted in the cockpit and comprises a double-plate combiner 1 whose plate holding structure, which is generally opaque, still constitutes a considerable part of the visual mask which is annoying for the pilot. Preferably, the only element of the head-up visor 7 which is located in the external field of vision CV of the pilot is the double-plate combiner 1; the upper surface 70 of the head-up visor 7 is then located at the level of or below the lower limit LI of the external field of vision CV. The main part of the visual mask which is annoying for the pilot then consists of the double-plate combiner 1 and, more specifically, its plate holding structure. The double-plate combiner 1 comprises a central baseplate (not shown in FIG. 1), an inner plate 2, an outer plate 3, the mid-plane of the inner 2 and outer 3 plates being orthogonal to the plane of FIG. 1, two side flanks 4, only one of which is visible in FIG. 1, and two spacers 5, only one of which is visible in FIG. 1. Other elements are associated with the head-up visor 7, such as, for example, a cell 10 for automatically controlling the brightness of the synthetic images according to the brightness of the external scene, two side displays 8 presenting the pilot with information which is not collimated at infinity, only one side display 8 being visible in FIG. 1, and a control panel 9. Synthetic images collimated at infinity, coming from the head-up visor 7, are reflected on the two plates which are partly transparent and partly reflecting in the visible spectral region, and reach the pilot's eyes. Thus, by looking through the double-plate combiner 1, the pilot can see the external scene superimposed on the symbology formed by the various synthetic images collimated at infinity. The distance d of the pilot's eyes 13 from the inner plate 2 of the double-plate combiner 1 is, for example, about 30 cm to 40 cm.

The double-plate combiner for a head-up visor comprises two substantially flat plates, that is to say plates which are flat enough so that the symbology reflected by these plates is not distorted, so as not to substantially degrade the vision of the pilot. The plates are substantially parallel to each other, that is to say parallel enough to each other so that the symbology does not appear to be duplicated in the eyes of the pilot, which would strongly degrade the pilot' vision. The plates are held fixedly together by a holding structure, so as to remain substantially immobile with respect to the head-up visor and therefore with respect to the cockpit of the aircraft.

The plate holding structure comprises a central baseplate connecting the combiner to the structure carrying the head-up visor. Two side flanks are connected to the central baseplate. A spacer is connected to each side flank. The outer plate is tightly held between the free ends of the two spacers and the inner plate is tightly held between the ends, connected to the side flanks, of the two spacers. At least the assembly consisting of the plates, the side flanks and the spacers presents a plane of symmetry which is substantially orthogonal to the mid-plane of the plates. For example, in FIG. 1, this plane of symmetry is the plane of FIG. 1. The dimension, from one spacer to the other, of the outer plate is greater than the dimension, from one spacer to the other, of the inner plate. The spacers, at least at their central part, that is to say away from their ends which tightly hold the plates, have the shape of a sheet which is flat enough to have a mid-plane, so as to minimize the visual mask created by the spacers. The mid-plane of each spacer is not orthogonal to the mid-plane of the plates. By virtue of the difference in size of the dimensions of the plates from one spacer to the other and by virtue of the nonorthogonal inclination of the mid-plane of each spacer with respect to the mid-plane of the plates, the spacers are respectively placed so that a significant proportion of them are hidden from the pilot's view by the side flanks to which said spacers are connected. The reduction in size of the visual mask which is annoying for the pilot may thus reach 60% of the existing visual mask with standard double-plate combiners of the prior art. Furthermore, by virtue of the inclination of the mid-plane of each of the spacers, since the spacers are no longer seen or almost no longer seen by the pilot, the unwanted reflections from, for example, light sources located on the runway during the landing phase are no longer directed toward the pilot's eyes. The unwanted reflections directed toward the pilot's eyes have therefore been removed or, at the very least, strongly attenuated.

Figure 2:
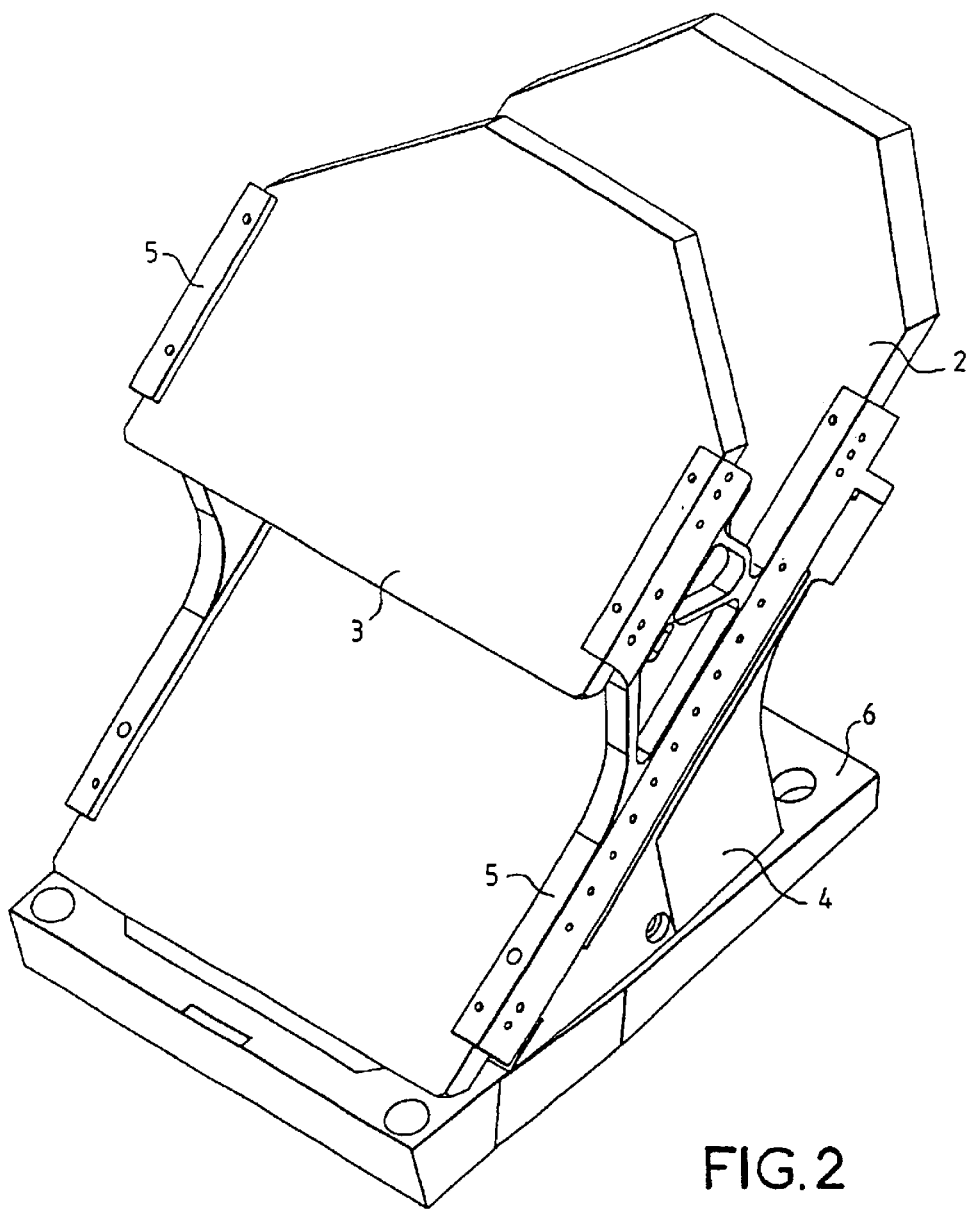
FIGS. 2 and 3 schematically show perspective views of a combiner according to the invention, FIG. 3 being seen somewhat through the pilot's eyes and FIG. 2 being seen somewhat from the external scene.
Figure 3:
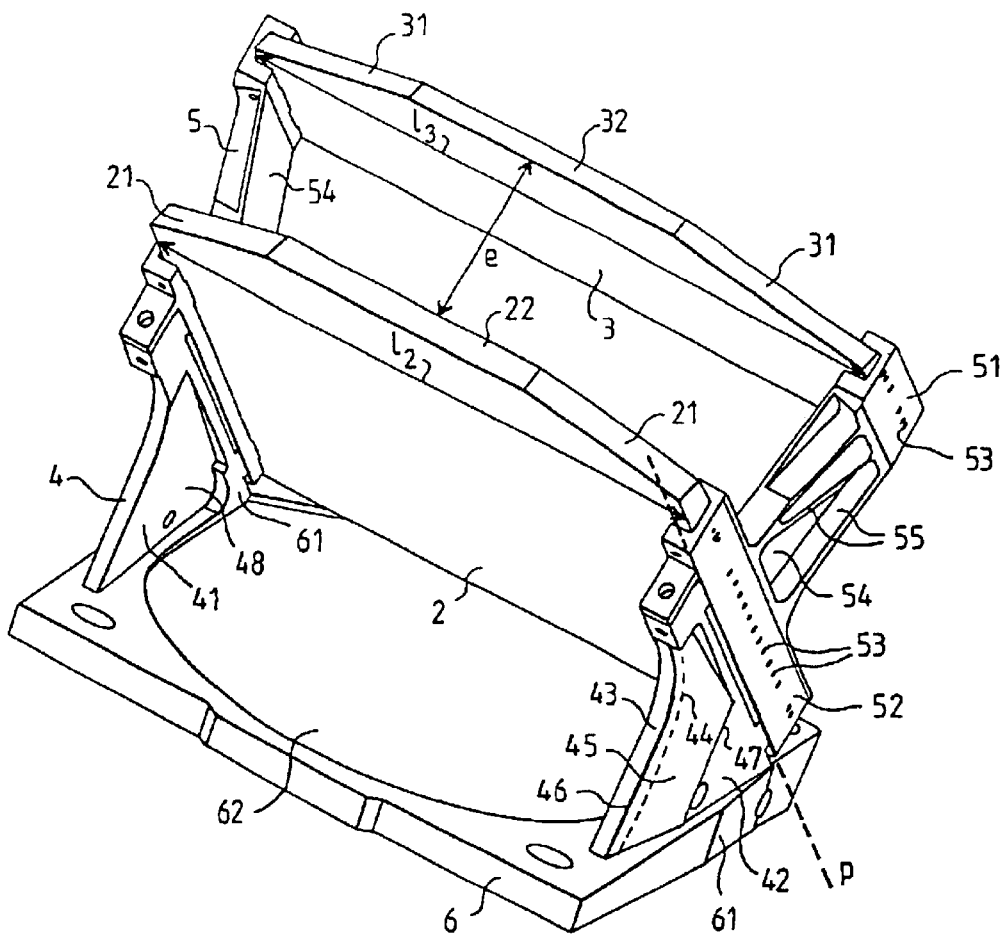

FIGS. 2 and 3 schematically show perspective views of a combiner according to the invention, FIG. 3 being seen somewhat through the pilot's eyes and FIG. 2 being seen somewhat from the external scene. In FIG. 2, only the main parts of the double-plate combiner are shown, while in FIG. 3 the various parts of the combiner are described more specifically. The double-plate combiner 1 shown in FIG. 2 comprises two plates, an inner plate 2 and an outer plate 3. The inner plate 2 is also called a "large plate" because of its length and the outer plate 3 a "small plate". Both inner 2 and outer 3 plates are fixedly held one with respect to the other by means of two spacers 5. Each spacer 5 is connected to a side flank 4 in a fixed manner, that is to say that each spacer 5 is attached to a side flank 4, the two side flanks 4 resting on a central baseplate 6 to which said side flanks 4 are attached.

FIG. 3 shows the same double-plate combiner 1 as FIG. 2 but seen from another angle. The inner 2 and outer 3 plates respectively comprise upper parts 22 and 32 which are the parts furthest from the central baseplate 6 and which are chamfered at their ends in order to decrease the weight of the double-plate combiner 1 without, however, vignetting the instantaneous field in which the synthetic images seen by the pilot can be displayed. The upper parts 22 and 32 have chamfers 21 and 31 respectively, which give said upper parts 22 and 32 a trapezoidal profile. The trapezoidal profile of the outer plate 3 is positioned in line with the trapezoidal profile of the inner plate 2 so as to be hidden thereby from the pilot's vision. From one spacer 5 to the other, the respective dimensions of the inner 2 and outer 3 plates are the widths $l_2$ and $l_3$, while the relative distance kept between the plates 2 and 3 by the spacers 5 is the separation e. In a preferred numerical example, the width $l_2$ is about 135 mm, the width $l_3$ is about 155 mm, while the separation e is about 50 mm. For the visible spectral region, the reflection coefficient of the outer plate 3 is, for example, about 25%, while the upper part of the inner plate 2, the part which is located between the pilot's eyes and the inner plate 2, is transparent and nonreflecting, the lower part of the inner plate 2 itself having a reflection coefficient of, for example, about 20%. The material forming the body of the plates, not including the surface treatments, is advantageously polished standard optical glass. The angle existing between the mid-plane of the plates 2 and 3 and the mid-plane of the central baseplate 6 is preferably about 45 degrees.

In FIG. 3, the plates 2 and 3 are tightly held between two spacers 5. The outer plate 3 is tightly held between the free ends 51 of the two spacers 5. The inner plate 2 is tightly held between the ends 52, connected to the side flanks 4, of the spacers 5. The functional limit between spacer 5 and side flanks 4 is indicated by dotted lines p in FIG. 3. The free ends 51 or ends 52 connected to the side flanks 4 advantageously comprise holes 53 serving for the injection of adhesive between the plates 2 and 3 and the spacers 5 when mounting the double-plate combiner 1.

Preferably, the central part of each spacer is in the form of a solid sheet, in order to improve the stiffness of the plate holding structure of the double-plate combiner. Advantageously, each solid sheet has ribs located toward the outside of the double-plate combiner, in order to improve the stiffness of the plate holding structure. The orientation of the ribs toward the outside of the double-plate combiner contributes, to a small extent, to the decrease in size of the overall visual mask of the plate holding structure.

In FIG. 3, the central part 54 of each spacer 5 is in the form of a solid sheet. The solid sheet 54 comprises ribs 55 located toward the outside of the double-plate combiner 1. Each side flank 4 has an inner surface 41 located toward the inside of the double-plate combiner 1 and an outer surface 42 located toward the outside of the double-plate combiner 1. There is an edge 44, shown in dotted lines in FIG. 3, at the intersection between the outer surface 42 and the surface 43 consisting of the free thickness of each side flank 4.

Preferably, the mid-planes of the side flanks are substantially orthogonal to the mid-plane of the plates and each side flank is at least partly chamfered at one edge located at the intersection between the surface, located toward the outside of the double-plate combiner, parallel to the mid-plane of said side flank, of said side flank and the surface consisting of the free thickness of said side flank. These chamfers make it possible to decrease the size of the overall visual mask of the plate holding structure by an additional 10%, bringing the total reduction of the overall visual mask of the plate holding structure to about 70% of the overall visual mask presented by the standard double-plate combiners of the prior art. Advantageously, the surface, located toward the inside of the combiner, of each side flank is at least partly chamfered at the point, located at the parts of the baseplate and of the spacer connected to said side flank which are closest to each other, of said side flank. This brings about a slight additional decrease in the size of the visual mask of the plate holding structure.

In FIG. 3, the edge 44 is virtual, since each side flank 4 has a chamfer 45 going from the edge 46 which belongs to the surface 43 of the free thickness of the side flank 4 up to the edge 47 of the outer surface 42.

The inner surface 41 of each side flank 4 is also chamfered at its point 48 located between, on the one hand, the end 52, attached to the side flank 4, of the spacer 5, and, on the other hand, the part 61, which is closest to the spacer 5, of the central baseplate 6. The baseplate 6 preferably has a hole 62 through which light beams conveying synthetic information collimated at infinity and coming from the head-up visor pass. The chamfer or chamfers which each side flank 4 has makes it possible to reduce the size of the visual mask which the side flanks 4 present to the pilot. However, by virtue of the chamfers, especially 45, which the side flanks 4 have, on the one hand the lens normally placed in the hole 62 is not closed off, and on the other hand the plate holding structure does not exceed the size permitted for the double-plate combiner 1, which could be the case in the case of a simple inclination of the side flanks 4 without a chamfered part.

Preferably, the angle existing between the mid-plane of each of the spacers and the normal to the mid-plane of the plates is between 5 and 15 degrees. This angle is, for example, about 10 degrees in FIG. 3.

Preferably, the ratio of, on the one hand, the difference between the dimension, from one spacer to the other, of the outer plate and that of the inner plate to, on the other hand, the sum of the dimension, from one spacer to the other, of the outer plate and that of the inner plate is between 5% and 10%. In the preferred numerical example described above in connection with FIG. 3, this ratio is about 7%, that is to say (155 mm−135 mm)/(155 mm+135 mm).

Figure 4:
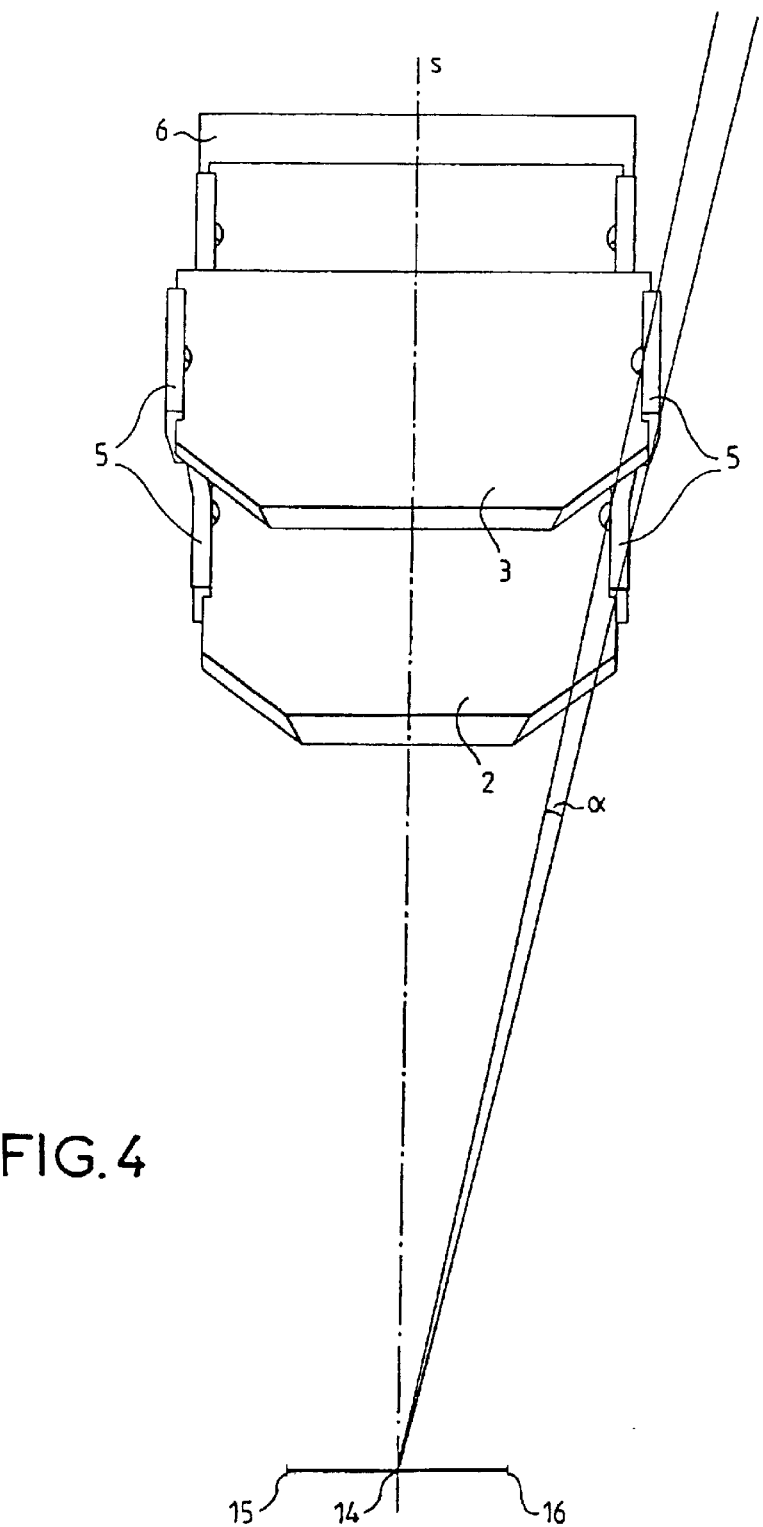
FIGS. 4 and 5 schematically show top views of a combiner according to the invention, demonstrating the decrease in size of the visual mask seen by the pilot which has been obtained.
Figure 5:
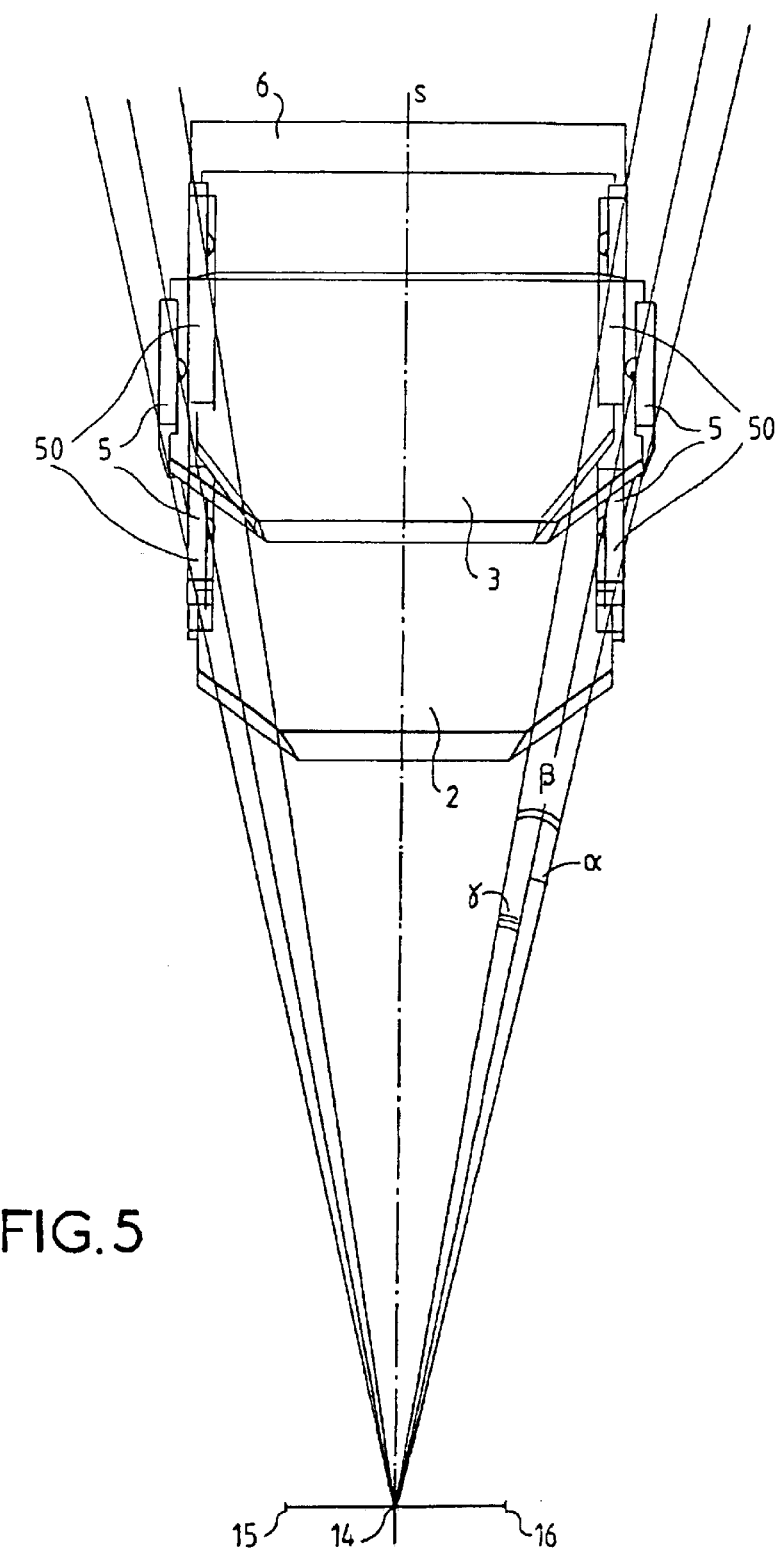

FIGS. 4 and 5 schematically show top views of a combiner according to the invention, demonstrating the decrease in the size of the visual mask seen by the pilot which has been obtained. A virtual element, called a "cyclops' eye" and denoted 14 in FIGS. 4 and 5, is considered; the cyclops' eye 14 is in the middle between the two eyes, left eye 15 and right eye 16, of a pilot. The plane orthogonal to FIG. 4 or 5 and passing through the axis s is the plane of symmetry of the assembly consisting of the plates 2 and 3, the side flanks 4 and the spacers 5 of the double-plate combiner 1 according to the invention. The overall visual mask seen by the cyclops' eye 14 is representative of the visual mask seen by the two eyes of the pilot in a real configuration. The overall angular visual masks considered below in this paragraph are the angular visual masks in the plane of FIGS. 4 and 5, that is to say in the azimuth of the pilot. In the case of a double-plate combiner according to the invention, the overall angular visual half-mask of the plate holding structure seen by the cyclops' eye 14 is α. In the case of a standard double-plate combiner of the prior art, the plates 2 and 3 are held by spacers 50 placed directly in line with the side flanks 4 (not visible in FIGS. 4 and 5). The dimension, from one spacer 50 to the other, is the same for the plates 2 and 3. The overall half angular visual mask seen by the cyclops' eye 14 is then β. The relative reduction in size of the overall angular visual mask obtained by substituting a double-plate combiner according to the invention for a standard double-plate combiner of the prior art is $2\gamma/2\beta = 2(\beta-\alpha)/2\gamma$ and may reach 60% for normal dimensions of side flanks 4 and of spacers 5.

Preferably, the holding structure consists of three parts made in one piece and separate from each other, two spacers and an upright, the upright bringing the baseplate and the side flanks together. This cutting of the plate holding structure into three parts improves the stiffness of the entire double-plate combiner, once the plates are mounted inside their holding structure. The material of the holding structure advantageously consists of an aluminum alloy.

The double-plate combiner according to the invention is intended to be mounted especially in aircraft. The aircraft may be civil or military airplanes. In the case of a military airplane, where the vibrating environment is severe, the double-plate combiner according to the invention, which is particularly stiff, is particularly advantageous.

What is claimed is:

1. A double-plate combiner for a head-up visor, comprising:

two substantially flat plates, substantially parallel to each other and held fixedly together by a holding structure that comprises a central baseplate, two side flanks connected to the central baseplate, and two spacers respectively connected to the two side flanks and tightly holding the two plates between them, an outer plate being tightly held between free ends of the two spacers, an inner plate being tightly held between the free ends, connected to the two side flanks, of the two spacers;

wherein an assembly of the two plates, the two side flanks, and the two spacers has a plane of symmetry substantially orthogonal to a mid-plane of the two plates, wherein a first dimension from one spacer to the other of the outer plate is greater than a second dimension from one spacer to the other of the inner plate, and wherein a mid-plane of each spacer is not orthogonal to the mid-plane of the two plates.

2. The combiner as claimed in claim 1, wherein mid-planes of the two side flanks are substantially orthogonal to the mid-plane of the two plates, and wherein each side flank is at least partly chamfered at one edge located at an intersection between a first surface, located toward an outside of the combiner, parallel to the mid-plane of the two side flanks, and a second surface of a free thickness of the two side flanks.

3. The combiner as claimed in claim 2, wherein a third surface, located toward an inside of the combiner, of each side flank is at least partly chamfered at a point, located at parts of the central baseplate and of the spacer connected to the two side flanks that are closest to each other, of the two side flanks.

4. The combiner as claimed in claim 1, wherein the holding structure includes three parts made in one piece and separate from each other, including the two spacers and an upright, the upright bringing the central baseplate and the two side flanks together.

5. The combiner as claimed in claim 1, wherein a central part of each spacer is in a form of a solid sheet.

6. The combiner as claimed in claim 5, wherein each solid sheet includes ribs located toward an outside of the combiner.

7. The combiner as claimed in claim 1, wherein an angle existing between the mid-plane of each of the spacers and a normal to the mid-plane of the two plates is between 5 and 15 degrees.

8. The combiner as claimed in claim 1, wherein a ratio of a difference between the first dimension and the second dimension to a sum of the first dimension and the second dimension is between 5% and 10%.

9. The combiner as claimed in claim 1, wherein a material of the holding structure is an aluminum alloy.

* * * * *